United States Patent [19]

Magel

[11] 4,310,229
[45] Jan. 12, 1982

[54] METHOD AND APPARATUS FOR AUTOMATIC EXPOSURE CONTROL ON A PHOTOGRAPHIC CAMERA

[75] Inventor: Rolf Magel, Fernwald, Fed. Rep. of Germany

[73] Assignee: Ernst Leitz Wetzlar GmbH, Wetzlar, Fed. Rep. of Germany

[21] Appl. No.: 94,341

[22] Filed: Nov. 14, 1979

[30] Foreign Application Priority Data

Dec. 8, 1978 [DE] Fed. Rep. of Germany ....... 2853067

[51] Int. Cl.³ ............................................. G03B 7/085
[52] U.S. Cl. ..................................................... 354/43
[58] Field of Search ...................... 354/36, 38, 37, 43, 354/44, 41, 29, 30, 28; 352/141

[56] References Cited
U.S. PATENT DOCUMENTS 4,174,160 11/1979 Nanba et al. ...................... 354/38 X
4,200,374 4/1980 Shimizu et al. ................... 354/60 R

*Primary Examiner*—L. T. Hix
*Assistant Examiner*—William B. Perkey

*Attorney, Agent, or Firm*—Schwartz, Jeffery, Schwaab, Mack, Blumenthal & Koch

[57] ABSTRACT

Disclosed is a method and apparatus for automated exposure control in a photographic camera having a lens equipped with an automatically adjusting diaphragm. A measuring signal is provided which is proportional to the luminance of the subject, the sensitivity of the film and the initial aperture at which the diaphragm is set. A control device is provided which stops the moving aperture at its working opening. A reference signal is provided by combining the measuring signal with a signal proportional to a shutter speed limit value. The diaphragm automatic adjustment is initiated and the variation or change in diaphragm aperture is converted to a signal which is combined with the measuring signal. This varying signal is continuously compared with the reference signal and a control signal to stop the automatic adjustment of the diaphragm is issued when the signals being compared are equal. In one embodiment of the invention, the reference signal is provided by combining the measuring signal and the shutter speed limit value in a 1-to-1 ratio. This ratio can be changed to provide either shutter speed or aperture priority if desired.

13 Claims, 4 Drawing Figures

METHOD AND APPARATUS FOR AUTOMATIC EXPOSURE CONTROL ON A PHOTOGRAPHIC CAMERA

BACKGROUND OF THE INVENTION

The present invention relates generally to photographic equipment and particularly to automatic exposure control systems in a camera.

Automatic exposure control is known in a photographic camera with exchangeable lenses where each lens is equipped with an automatically adjusting diaphragm. A control device determines the magnitude of the working aperture by comparing a signal potential which is proportional to a shutter timing value and serves as the reference with a signal potential which is proportional to the luminance of the scene, the sensitivity of the film and the existing diaphragm aperture of the taking lens used. The control device passes the signal resulting from said comparison to a timing unit. Processes and devices of this type are intended to control the exposure in a photographic camera so that following the selection of a shutter speed value the diaphragm of the lens being used adjusts automatically as a function of the scene luminance and film sensitivity to an aperture yielding the correct exposure.

In West German Offenlegungsschrift No. 24 33 894 equivalent to U.S. Pat. No. 3,964,073 an exposure control device for a photographic camera is disclosed wherein an exposure measuring circuit initially produces a signal proportional to the luminance of the scene, film sensitivity and the initial aperture of the lens used. The signal is compared with the signal indicative of the shutter speed value preselected on the camera. The difference between the two potentials is an indication of the setting of the lens diaphragm aperture necessary to produce a correct exposure. Due to the movement of the lens diaphragm, released by the triggering of the camera, the signal at the output of the exposure measuring circuit varies continuously. When the potentials of the signals of the exposure measuring circuit and the shutter speed value are equal, a comparator activates a magnet and stops the closing of the diaphragm at the working aperture.

Faults inherent in the diaphragm arresting device caused by certain time constants as there are the dropping off of a magnet, the falling in of latches etc, for instance operate to permit the closing of the diaphragm beyond the set value intended and are detrimental to the exact shutter speed desired for exposure of the film.

SUMMARY OF THE INVENTION

It is therefore an object of the present invention to eliminate the deficiencies caused by time constant delays.

It is a further object of the present invention to provide an automatic programming device with time priority for an automatic exposure control camera.

It is a still further object of the present invention to provide a controllably adjusting, automatic system for obtaining the proper exposure value for film in an automatic camera.

The above and other objects are attained by the combination of apparatus for and the method steps of: providing a control device for setting the aperture of the lens in response to a comparison signal; providing a measuring signal proportional to the luminance of the object, the sensitivity of the film and the initial diaphragm aperture of the lens; providing a reference signal by combining the measuring signal and a signal proportional to the shutter speed limit value; providing a variation of the measuring signal in proportion to the automatic adjustment of the diaphragm aperture; comparing the variation of the measuring signal with the reference signal; and providing a comparison signal when the variation of the measuring signal is equal to the reference signal.

In one preferred embodiment, the reference signal is generated by combining the measuring signal and a signal proportional to the shutter speed limit value in a 1:1 ratio. In a further preferred embodiment of the present invention, a voltage divider is utilized to provide the reference signal but the ratio of the measuring signal to the shutter speed limit signal is controllably varied depending upon the selected shutter speed.

BRIEF DESCRIPTION OF THE DRAWINGS

A more complete appreciation of the invention and the intended advantages thereof will be more clearly understood by reference to the following drawings, wherein.

DETAILED DESCRIPTION OF PREFERRED EMBODIMENTS

Figure 1:
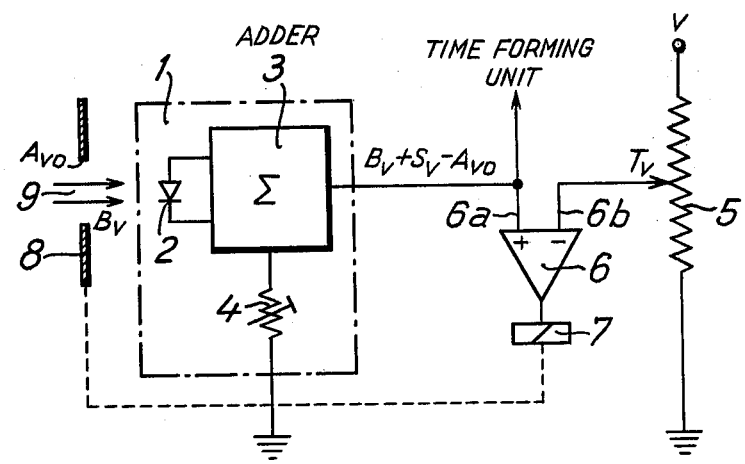
FIG. 1 is an electrical schematic of a prior art exposure control device.

Generally the present invention is an automatic exposure control for a photographic camera with a lens which is equipped with an automatically adjusting diaphragm. A control device determines the magnitude of the working aperture by comparing a reference signal potential proportional to a shutter speed value with a measured signal proportional to the scene luminance, film sensitivity and the initial diaphragm aperture of the lens used. The control device then passes the signal resulting from said comparison to the diaphragm adjusting mechanism. However, in the present invention: a measuring signal which is proportional to the scene luminance, film sensitivity and initial aperture of diaphragm is stored; a a variation of the measured signal resulting from the automatic adjustment of the diaphragm is generated electromechanically; and the reference signal is generated by the combination of the measured signal stored and a signal proportional to a limiting shutter speed value.

In a preferred embodiment, the reference signal may be formed as a function of a resistance ratio and changes in priority of aperture and shutter speed may be controlled by varying the resistance ratio. To achieve this function, a storage means is inserted following the light measuring device, which stores the measured signal proportional to the scene luminance, film sensitivity and initial diaphragm aperture upon the release of the camera. A disconnecting switch is provided to disconnect the storage means following the arrival of the output signal generated by the light measuring device from said light measuring device. An electric structural element is provided to form an electric signal proportional to the actual diaphragm aperture. In one embodiment, the electrical structural element is a potentiometer having a slide mechanically interconnected with the continuously varying diaphragm. Further, the voltage divider may consist of resistances connected in series in a resistance ratio of 1:1. If another ratio of the resistances is preferred for the generation of the reference voltage, the resistances connected in series may assume a resistance ratio not equal to 1:1. A shutter speed voltage generator is connected to a voltage divider and provides a signal that is proportional to a limiting value of the shutter speed. The voltage divider combines the shutter speed limit signal and the signal stored in the storage means.

It may be desirable that upon the variation of the exposure value ($E_V$) for different conditions the aperture and shutter speed should not change in an equivalent manner but with differential priorities. For example, to attain a range of shutter speeds safe with respect to blurring as soon as possible, means capable of varying the reference signal may be included between the shutter speed voltage generator and the voltage divider, in order to vary the action priority between the diaphragm and timing. For this reason, comparators and transistors may be provided as circuit elements. It is proposed as a further embodiment of the invention to provide a switch in the exposure control device capable of cutting out the generation of the reference signal, so that the photographic camera may also be operated with the automatic diaphragm device as known from the above-cited reference.

Referring now to the drawings wherein like reference characters designate like parts throughout the several views, FIG. 1 shows a known exposure control device with an automatic diaphragm adjustment. It consists of a light measuring unit 1, which includes a photoelectric receiver system 2, an adder stage 3 and a film sensitivity transmitter 4. Also in the control device is a shutter speed value transmitter 5, a comparator stage 6 and a holding magnet 7 which is mechanically connected (as shown by the dashed lines) with the automatically and continuously self-adjusting diaphragm 8 of an exchangeable lens (not shown).

As indicated by the arrows 9, the reflected light of the object to be photographed impacts the photoelectric receiver system 2 through the diaphragm 8 at its initial position, of the light measuring device 1. This generates a measuring signal proportional to the object luminance ($B_V$) and the film sensitivity ($S_V$) less the magnitude of the initial diaphragm aperture ($A_{Vo}$) of the lens being used. This signal is conducted to the input 6a of the comparator stage 6. At the other input 6b a reference signal ($T_V$) is applied, said reference signal being proportional to a desired shutter speed value and emitted by the shutter speed value transmitter 5 which is supplied with a voltage V. The difference between the two signals applied to the comparator indicates the extent to which the diaphragm 8 must close to provide the correct exposure.

The determination of the working aperture of the diaphragm 8 is initiated by the release of the camera, not shown. When released, the diaphragm heretofore held in its initial aperture setting, begins to close. With the diaphragm, which is now changing continuously, the signal at the output of the light measuring device also varies continuously. This signal is compared continuously in the comparator stage 6 with the reference signal generated in the shutter speed value transmitter 5.

When equality between the two signals is attained, the magnet 7 connected to the comparator stage 6 in series is excited by a control signal and the further closing of diaphragm is prevented by means of the active interaction between the magnet and the diaphragm. At this point, the actual shutter speed is determined by the Time Forming Unit (not shown) which is also connected to the output of the light measuring unit 1.

The stopping of the diaphragm 8 may be effected with a greater or lesser accuracy, if for example, the diaphragm exceeds its set value because of certain time constants as there are the dropping off of the magnet, the falling in of latches, etc. inherent in the device. These faults, however, do not create errors of exposure, because the output signal of the light measuring device 1 and not the signal ($T_V$) generated by the shutter speed value transmitter 5 is used to determine the actual shutter speed. If, for example, the diaphragm 8 has narrowed excessively, said signal will be correspondingly smaller and the resulting exposure time will be correspondingly longer. However, in most cases this effect is undesirable.

Figure 2:
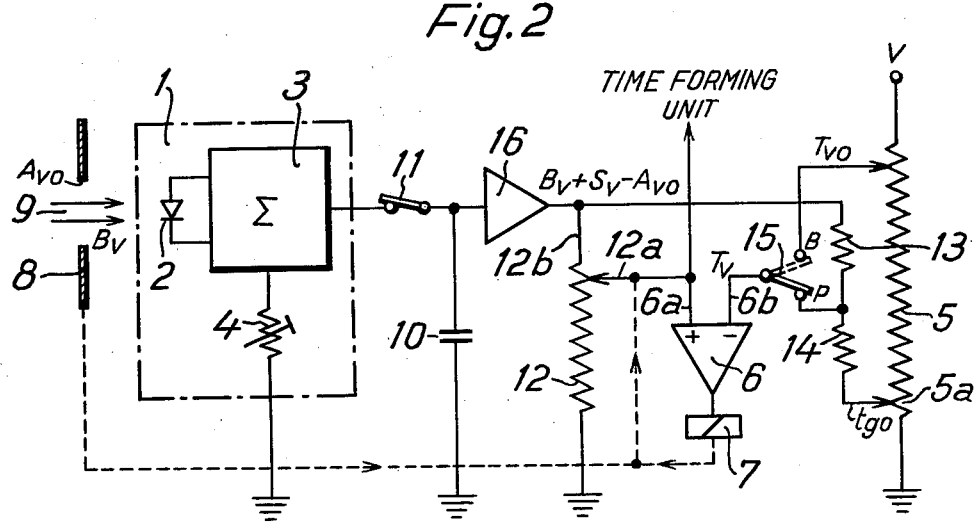
FIG. 2 is an electrical schematic of an exposure control device in accordance with the present invention.

An exposure control device that lacks this deficiency and further comprises a programmed automatic device is shown in FIG. 2. It is to be noted that all of the structural elements performing the functions indicated in FIG. 1 are identified by the same reference symbols.

The exposure control device shown in FIG. 2 also comprises a means for generating a measuring signal proportional to the luminance of the camera object, the film sensitivity and the initial lens aperture such as a light measuring device 1; a means for generating at least one signal indicative of a selected shutter speed such as shutter speed value transmitter 5; a comparator means such as comparator stage 6 and a magnet 7 in active interaction with the diaphragm 8 of the lens used. The exposure device further comprises storage means, for example, a storage capacitor 10 that is connected with the light measuring unit 1 by means of a disconnecting switch 11. A means for providing a variation signal of the measuring signal, in one embodiment, a potentiometer 12 having a slide 12a which is connected both mechanically to the diaphragm 8 of the lens being used and electrically to the comparator stage 6. A means for combining the stored measuring signal with the shutter speed value signal may comprise a voltage divider consisting of the resistances 13 and 14 connected between the stored measuring signal and the shutter speed value transmitter 5. Further, between the comparator stage 6 and the speed value transmitter 5, there is a selector switch 15 switchable to one of the contacts B (automatic diaphragm unit) or P (automatic program unit).

The exposure control device connected in this manner operates as follows: The light measuring device 1 provides an output signal proportional to the APEX value $B_V + S_V - A_{vo}$. When the camera is triggered, this signal is initially transferred to the storage capacitor 10 connected to the light measuring device and then the light measuring device 1 is disconnected from the capacitor 10 by means of the disconnecting switch 11. High impedance amplifier 16 prevents the charge on capacitor 10 from being bled off through potentiometer 12 and maintains at its output, a voltage equal to the charge on the capacitor. When the selector switch 15 is switched to the contact B (automatic diaphragm as shown in dotted lines) the shutter speed value transmitter 5 provides a reference signal ($T_V$) at the input 6b of the comparator stage 6, which is proportional to a manually selected shutter speed value.

The circuit with the switch in position B operates as in FIG. 1 and the difference between the two voltages indicates the extent to which the diaphragm must close in order that the exposure will be correct for a desired shutter speed which is then set by the Time Forming Unit (not shown) connected to input 6a.

In order to automatically set the working aperture of the diaphragm 8, the latter is mechanically coupled with the slide 12a of the potentiometer 12, said slide being positioned at the upper end 12b of the potentiometer 12 if the diaphragm is open. When the triggering of the camera automatically begins closing the diaphragm 8, the slide 12a of the potentiometer 12 is simultaneously started. This provides a signal at 12a which is proportional to the prevailing aperture of the diaphragm. If the signals at the inputs 6a, 6b of the comparator are equal, the magnet 7 is energized and further closing of the diaphragm and movement of the slide 12a is stopped. The voltage at the potentiometer 12a, indicative of the luminance of the object, the film sensitivity, the initial diaphragm aperture and the extent to which the aperture has been closed, is passed for further processing in a known manner to a Time Forming Unit, not shown.

When the selector switch 15 is on the contact P (program automation, as shown), the reference signal ($T_V$) will be generated automatically. For this purpose, a signal is taken from the shutter speed value transmitter 5 proportional to a shutter speed limit value $t_{go}$ and connected with the voltage output of amplifier 16 by means of the resistances 13 and 14 forming a voltage divider. The combination signal resulting from this connection is passed to the input 6b of the comparator stage 6. Herein, the measuring signal produced by the light measuring unit 1 and proportional to the APEX values $B_V+S_V-A_{vo}$ corresponds to a shutter speed value $T_{Vo}$ which, with an open diaphragm, would lead to a correct exposure. The signal is compared with a signal taken from the shutter speed value transmitter at a terminal 5a which is proportional to the shutter speed limit value $t_{go}$ (for example 1/15 s with the diaphragm open).

Between the shutter speed values of $T_{Vo}$ and $t_{go}$ there are numerous different shutter speed/aperture combinations which will provide the correct exposure value. When the resistances 13, 14 forming the voltage divider are in a ratio of 1:1, a voltage will be established during the above-described combination of the two signals at the terminal P corresponding to the arithmetic average of the two signals for $T_{Vo}$ and $t_{go}$. This reference is conducted to the comparator stage at the input 6b, where it is compared with the variation signal, which varies in keeping with the aperture of the diaphragm 8. When the voltages are equal, as described hereinabove, the closing of the diaphragm is terminated by means of the energization of the holding magnet 7. The voltage present at slide 12a of the potentiometer 12 is thus also proportional to the arithmetic average of the voltages for $t_{go}$ and $T_{Vo}$. It is conducted to the Time Forming Unit (not shown) where it is converted into a shutter speed corresponding to the geometric mean value of the speeds $T_{Vo}$ and $t_{go}$.

For example, a shutter speed limit may be $t_{go}=1/15$ s which corresponds to $U_{tgo}=550$ mV and a shutter speed value of $T_{vo}=1/1000$ s which corresponds to $U_{Tvo}=658$ mV. Here use of $U_{tgo}$ is the limiting voltage at 5a corresponding to a voltage indicative of the aperture necessary for proper exposure at the slowest shutter speed and $U_{Tvo}$ is the voltage indicative of the shutter speed necessary for proper exposure with a fully open aperture. This yields for $$U=(658\ mV+550\ mV)/2=604\ mV$$

and $$t=\sqrt{1/15\cdot 1/1000\ s^2}=1/125\ s.$$

With a ratio of 18 mV per change in shutter speed settings or diaphragm aperture values, respectively, (at room temperature), as obtained with the use of semiconductor paths in logarithmic and delogarithmic circuits, respectively, it is seen that with a variation of 604 mV−550 mV=54 mV or 3×18 mV, time must also vary by 3 values, i.e. from 1/15 s to 1/125 s. If this average time is fed to the comparator stage 6 as the reference voltage (switch 15 in position P), it will cause the magnet 7 to arrest the closing of the diaphragm 8 at the average geometric diaphragm aperture—i.e. the working aperture which is between the maximum aperture and the aperture necessary for proper exposure at the slowest shutter speed.

While the output signal of the light measuring unit 1 is less than or equal to the shutter speed limit voltage value ($U_{Tvo} \leq U_{tgo}$) the diaphragm will not move upon release of the camera, because the comparator stage 6 will immediately energize the magnet 7. The shutter speed indicated will be the slowest available which, as noted earlier, corresponds to the voltage of $U_{Tvo}$. If, however, the voltage from the light measuring unit exceeds the shutter speed limit voltage given ($U_{Tvo} > U_{tgo}$), then the difference of this voltage (at a ratio of the voltage dividing resistances 13 and 14 of 1:1) is converted by one half into a closing of the aperture and shortening of the shutter speed, as shown by the following example:

$U_{Tvo}=622$ mV represents $t=1/250$ s
$U_{tgo}=550$ mV represents $t=1/15$ s,
then, a voltage of $$U_T=(U_{Tvo}=U_{tgo})/2=(622+550)/2=586\ mV$$

is applied to the inlet 6b of the comparator stage 6. A diaphragm aperture proportional to this voltage will be set following the release of the camera. The potentiometer slide 12a scanning the closing of the diaphragm 8 will show a voltage change of 622 mV−586 mV=36 mV=2×18 mV, i.e. the diaphragm will close by two value units from its maximum aperture. Because the same voltage is also conducted by means of the slide 12a of the potentiometer 12 to the Time Forming Unit, not shown, the 586 mV voltage is 36 mV higher than the 550 mV of $U_{tgo}$ and thus the time forming unit will provide a shutter speed of 2(i.e. 36 mV/18 mV=2) increments faster (i.e., 1/60 s) than the slowest shutter speed (1/15 s).

Figure 3:
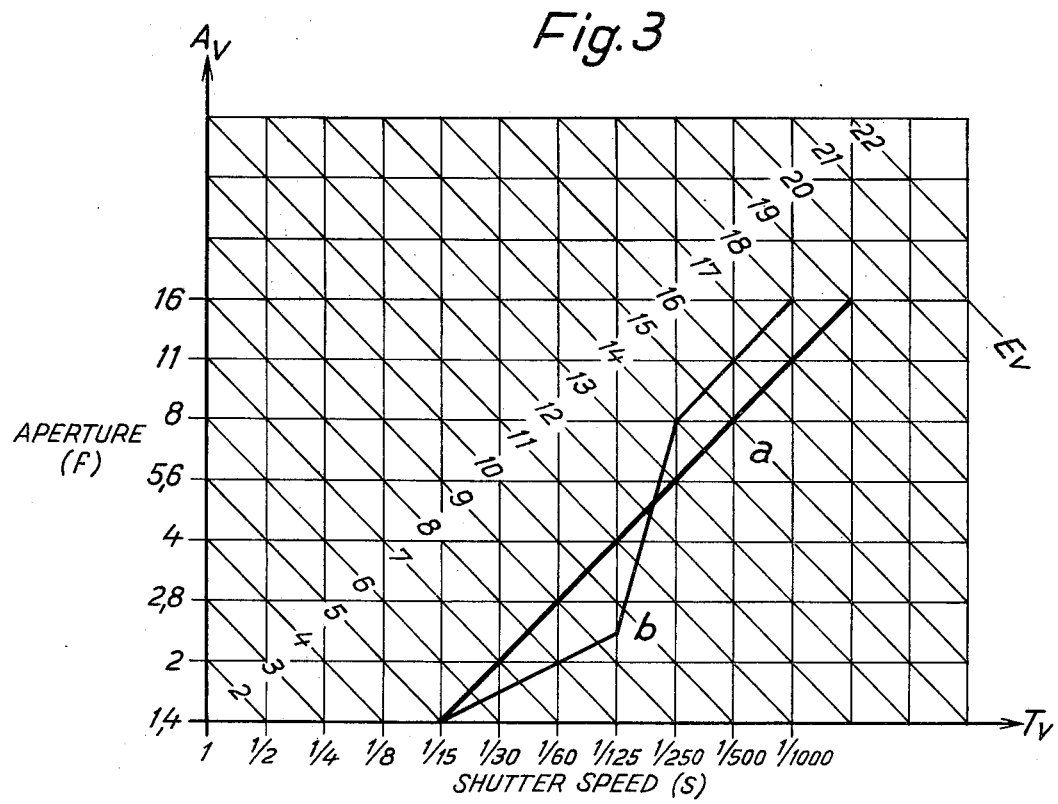
FIG. 3 is a graph plotting aperture settings versus shutter speed settings for different combining ratios.

With a ratio of 1:1 between the resistances 13 and 14, the automatic programming has a characteristic curve as shown by "a" in FIG. 3, originating at the speed limit value of 1/15 s and progressing as a straight line with a slope of 45°. In this process, as described hereinabove, the aperture of the diaphragm and shutter speed vary at an entirely equal rate with the variations in the exposure values EV.

Because there are many shutter speed and aperture combinations which will provide the same exposure, lines of constant exposure value (EV) have been provided on FIG. 3. For obvious reasons, it is often desirable to change the aperture and the shutter speed differently, for example to emerge more rapidly from the range of lower shutter speeds. An example of the possible configuration of such a characteristic curve is shown by the curve "b" in FIG. 3. According to the curve, beginning with the limiting shutter speed value 1/15 s, the larger aperture settings for a given exposure value are chosen. In this manner, the range of slow shutter speed is left more rapidly than in curve "a". Following the attainment of a shutter speed which will prevent blurring, the reduction of the diaphragm aperture is preferentially effected, which may be desirable in order to increase the depth of field of the camera. In the last section of the curve, the diaphragm aperture and the shutter speed again vary equally, but at a smaller aperture and slower shutter speed for a given exposure value than curve "a".

In order to obtain the line segments of curve b, the ratio of the resistances 13, 14 for each segment of the curve must be of different, but definite, values. This condition is satisfied by the embodiment of the present invention presented in FIG. 4, wherein all structural elements having similar functions as in FIGS. 1 and 2, are identified with the same reference symbols and wherein for the sake of clarity the light measuring unit 1 and the diaphragm 8 are no longer shown. For this purpose, a means for varying the resistance ratio is provided such as a resistance 17 connected in parallel with the resistance 13 and a resistance 18 in parallel with the resistance 14, either of which may be controllably connected and disconnected as required. The connection and disconnection is effected by means of the comparators 19 and 20, respectively. The signal produced in the light measuring unit 1 and stored in the storage capacitor 10 is conducted to one set of inputs 19a and 20a. The other inputs 19b and 20b, respectively, are connected to intermediate terminals 5b and 5c, respectively of the shutter speed value transmitter 5, from which a voltage, proportional to the shutter speed value at which the resistances 17 and 18, respectively, are to be connected or disconnected, may be taken off. The outputs 19c and 20c, respectively, of the comparators 19 and 20, are connected so as to base bias switching transistors 21, 23 into conduction adding resistances 17, 18 in parallel with resistances 13, 14, respectively, as desired.

The following sequence takes place for the characteristic curve "b" shown in FIG. 3. At exposure values of less than 9.5, the resistance ratio between resistances 13 and 14 is 1:2. Thus, as the luminance level of the camera's object increases (presuming the film sensitivity and initial aperture remain the same), the automatic programming mode will reach a shutter speed of 1/125 s more quickly than in curve "a". This is because an increase in the voltage $U_{Tvo}$ (the stored measuring signal) the shutter speed will increase by two values for every one value that the diaphragm closes.

As $U_{Tvo}$ is increasing (indicating a brighter camera object) a point will be reached in which $U_{Tvo}$ is greater than $U_{tg1}$ which may be adjustable by movement of the intermediate terminal along the shutter speed value transmitter 5. When equality is reached between the two inputs to comparator 20, the comparator will provide an output 20c through current limiting resistor 24 to base bias transistor 23 into conduction. When transistor 23 conducts, resistance 18 is effectively applied in parallel with resistance 14 and thus the resistance ratio would be:

$$R_{13} : \frac{R_{14} \cdot R_{18}}{R_{14} + R_{18}} = 1 : 0.28$$ (wherein $R_{13}$, $R_{14}$, $R_{18}$ are the resistance values of these resistances)

The combined resistance of the resistances 14 and 18 in parallel by the above formula is less than resistance 14 alone and in the embodiment shown which provides the line segment of curve "b" between shutter speeds of 1/125 and 1/250 s, would be equal to 0.28. Thus, during this portion of the graph (when transistor 23 is in conduction), for an increase in voltage $U_{tvo}$, time will increase by 0.28 jumps when the diaphragm increases by 1 jump or as can be seen, the diaphragm increases by 3.5 jumps when the shutter speed increases by only 1 jump. This permits the smaller diaphragm settings to be more quickly reached as $U_{Tvo}$ is increased in order to provide better depth of field for a given lens.

As can be seen by looking at the last segment of curve "b" (shutter speeds greater than 1/250 s) when $U_{Tvo}$ reaches a sufficiently high level such that it equals $U_{tg2}$ (the input 19b to comparator 19) an output will be provided at 19c of comparator 19 which through current limiting resistor 22 base biases transistor 21 into conduction placing resistor 17 in parallel with resistance 13. At this point then the resistance ratio will be as follows:

$$\frac{R_{13} \cdot R_{17}}{R_{13} + R_{17}} : \frac{R_{14} \cdot R_{18}}{R_{14} + R_{18}} = 1 : 1$$ ($R_{17}$ = resistance of the resistance 17)

Because the ratio is 1:1, a single step in shutter speed will be matched by a single step in aperture as the exposure value number is increased.

Figure 4:
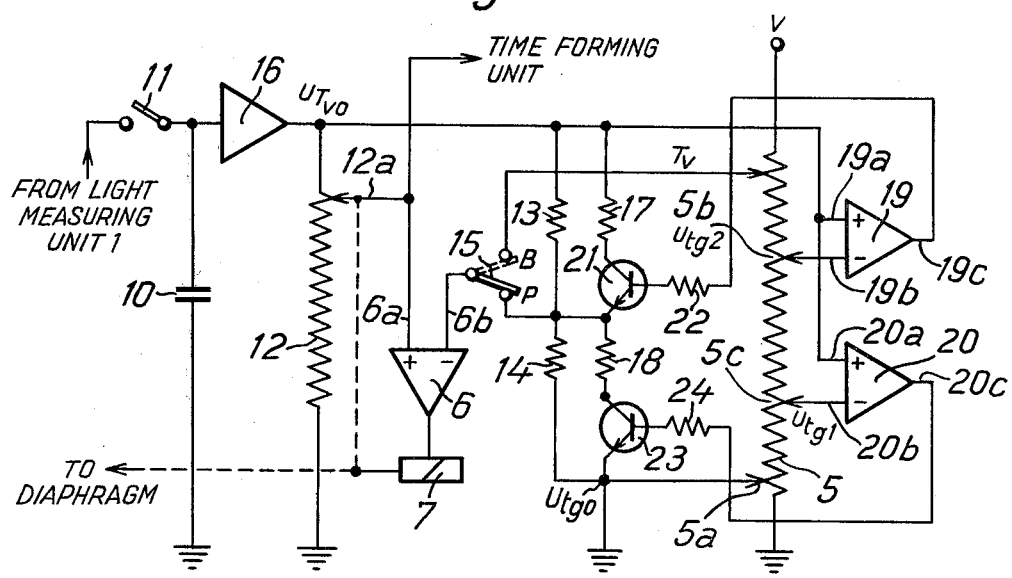
FIG. 4 is an electrical schematic of a further embodiment of the present invention.

As can be seen in FIG. 4, the intermediate terminals 5b and 5c can be adjusted for the voltage at which the comparator provides the necessary output to bias its respective transistor into conduction. Accordingly, the point at which curve "b" changes slope can be controllably adjusted. By varying the initial resistance ratio between resistors 13 and 14 as well as changing resistance values 17 and 18, and varying combination of desirable slopes can be automatically programmed into the camera. Additionally, numerous other comparator/transistor/resistance stages could be added such that there are more than three line segments utilized in making up curve "b".

Although the invention has been described relative to specific embodiments thereof, it is not so limited and many modifications and variations thereof will be readily apparent to those skilled in the art in light of the above teachings. It is, therefore, to be understood that, within the scope of the appended claims, the invention may be practiced otherwise than as specifically described.

The embodiments of the invention in which an exclusive property or privilege is claimed are defined as follows:

What is claimed is:

1. A method of automatically controlling exposure in a photographic camera with a lens equipped with an automatically adjusting diaphragm, said method comprising the steps of:

including in said camera a control device for setting a working aperture of said lens in response to a control signal;

providing a measuring signal proportional to a luminance of an object, a sensitivity of a film and an initial aperture of the diaphragm;

providing a reference signal by combining said measuring signal and a signal proportional to a shutter speed limit value;

electromechanically varying a signal proportional to said measuring signal in accordance with the actual diaphragm aperture;

comparing continuously the electromechanically varying signal proportional to the actual diaphragm aperture with said reference signal; and providing said control signal when said signals in said comparing step are equal.

2. The method of claim 1 wherein said providing a reference signal step includes the step of combining said measuring signal and a signal proportional to a shutter speed limit value in a one-to-one ratio.

3. An exposure control device for a photographic camera comprising:

a lens equipped with an automatically adjusting diaphragm, said diaphragm adjustable from an initial aperture to stop at a working aperture setting in response to a control setting;

means for generating a measuring signal proportional to a luminance of an object, a sensitivity of a film and a diaphragm aperture of the lens;

storing means for storing said measuring signal at said initial aperture;

means for generating a reference signal indicative of a selected shutter speed;

means for electromechanically varying a signal proportional to said measuring signal in accordance with the actual diaphragm aperture; and comparator means, responsive to said reference and said varying signals, for providing a control signal to stop said automatically adjusting diaphragm at said working aperture.

4. An exposure control device for a photographic camera comprising:

a lens equipped with an automatically adjusting diaphragm, said diaphragm adjustable from an initial aperture to stop at a working aperture setting in response to a control signal;

means for generating a measuring signal proportional to a luminance of an object, a sensitivity of a film and an initial diaphragm aperture of the lens;

storing means for storing said measuring signal at said initial aperture;

means for generating at least one signal indicative of a selected shutter speed including means generating a shutter speed limit signal indicative of the slowest shutter speed available in the camera;

means, responsive to said storing means, for providing a variation signal of said stored measuring signal, said variation signal proportional to movement of said diaphragm from an initial aperture to said working aperture;

means for combining said stored measuring signal and said shutter speed limit signal in a predetermined ratio and for providing a reference signal indicative of said combination; and comparator means, responsive to said reference and said variation signals, for providing a control signal to stop said automatically adjusting diaphragm at said working aperture.

5. An exposure control device according to claim 4, wherein said means for providing a variation signal comprises a potentiometer having a slide mechanically interconnected with said adjusting diaphragm.

6. An exposure control device according to claim 4, wherein said means for combining comprises a voltage divider connected between said stored measuring signal and said shutter speed limit signal, said voltage divider comprises at least two resistances connected in series and having a resistance ratio of 1:1.

7. An exposure control device according to claim 4, wherein said means for combining comprises a voltage divider connected between said stored measuring signal and said shutter speed limit signal, said voltage divider comprises at least two resistances connected in series and having a resistance ratio not equal to 1:1.

8. An exposure control device according to claim 4, wherein said means for combining comprises a first voltage divider connecting said stored measuring signal and said shutter speed limit signal, said divider having a predetermined resistance ratio, said combination signal provided at a terminal on said divider, said means for combining including means for changing said resistance ratio in response to said stored measuring signal.

9. An exposure control device according to claim 8, wherein said voltage divider comprises at least two portions, a first portion connecting said measuring signal and said terminal, and a second portion connecting said shutter speed limit signal and said terminal, said means for changing said resistance ratio comprises means for placing at least one further resistance in parallel with one of said portions of said divider thereby changing said resistance ratio.

10. An exposure control device according to claim 9, wherein said means for placing comprises a transistor and a resistance connected with said transistor's collector/emitter forming a series circuit, said series circuit connected in parallel with one of said portions, said means for placing further including a comparator whose output is connected to a base of said transistor, said comparator having two inputs, one of which is connected to said at least one signal indicative of said selected shutter speed and the other of which is connected to said variation signal, said comparator affecting conduction through said transistor and thus the resistance ratio when said comparator input reaches a predetermined ratio.

11. An exposure control device according to claim 9, wherein:

said means generating at least one signal indicative of a selected shutter speed comprises a second voltage divider, one end of which is grounded and another end of which is connected to a variable voltage supply, said second voltage divider including at least two intermediate terminals disposed at different points on the divider between ground and said voltage supply;

said means for placing comprises two separate circuits, each circuit comprising a transistor and a resistance connected with said transistor's collector/emitter forming a series circuit, each of said series circuits connected in parallel with a respective one of said portions of said first divider; and said means for placing further including two comparators each having outputs connected to respective bases of transistors, said comparators each having two inputs, one input of each comparator connected to said variation signal and the other input of each comparator connected to a respective one of said two intermediate terminals.

12. An exposure control device according to one of claims 4–11, wherein there is included switch means for controllably disconnecting said combination signal from said one comparator means input and simultaneously connecting said one comparator means input to said at least one signal indicative of a selected shutter speed.

13. A method of automatically controlling exposure in a photographic camera with a lens equipped with an automatically adjusting diaphragm, said method comprising the steps of:

including in said camera a control device for setting a working aperture of said lens in response to a control signal;

providing a measuring signal proportional to a luminance of an object, a sensitivity of a film and an initial aperture of the diaphragm;

sensing a shutter speed of said camera;

providing a reference signal by combining said measuring signal and a signal proportional to a shutter speed limit value in a ratio and adjusting said ratio in response to said sensing step;

providing a variation of said measuring signal in proportion to the automatic adjustment of said diaphragm aperture;

comparing said variation of said measuring signal with said reference signal; and providing said control signal when said signals in said comparing step are equal.

* * * * *